United States Patent
Lockman, III et al.

(10) Patent No.: US 11,818,021 B2
(45) Date of Patent: Nov. 14, 2023

(54) RESILIENT CONSENSUS-BASED CONTROL PLANE

(71) Applicant: Dell Products L.P., Round Rock, TX (US)

(72) Inventors: John A. Lockman, III, Granite Shoals, TX (US); Onur Celebioglu, Austin, TX (US); Lucas A. Wilson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/575,330

(22) Filed: Jan. 13, 2022

(65) Prior Publication Data

US 2023/0224229 A1     Jul. 13, 2023

(51) Int. Cl.
| | |
|---|---|
| *H04L 41/50* | (2022.01) |
| *H04L 41/5009* | (2022.01) |
| *H04L 41/5054* | (2022.01) |
| *H04L 67/104* | (2022.01) |

(52) U.S. Cl.
CPC ...... *H04L 41/5096* (2013.01); *H04L 41/5012* (2013.01); *H04L 41/5054* (2013.01); *H04L 67/1051* (2013.01)

(58) Field of Classification Search
CPC ............. H04L 41/5096; H04L 41/5012; H04L 41/5054
See application file for complete search history.

(56) References Cited

U.S. PATENT DOCUMENTS

| | | | |
|---|---|---|---|
| 11,119,872 B1* | 9/2021 | Jacobson | G06F 11/202 |
| 2015/0100636 A1* | 4/2015 | Hong | H04L 67/56 |
| | | | 709/204 |
| 2015/0195153 A1* | 7/2015 | Ahmed | G06F 9/452 |
| | | | 709/226 |
| 2019/0342383 A1* | 11/2019 | Matican | G06F 3/065 |

OTHER PUBLICATIONS

Gkikopoulos, Panagiotis & Schiavoni, Valerio & Spillner, Josef. (Jun. 9, 2021). Analysis and Improvement of Heterogeneous Hardware Support in Docker Images. In: Matos M., Greve F. (eds) Distributed Applications and Interoperable Systems. DAIS 2021. Lecture Notes in Computer Science, vol. 12718. Springer, Cham. https://doi.org/10.1007/978-3-030-78198-9_9.
"Getting Started with Docker," Web page <https://www.docker.com/get-started>, 1 page, Dec. 31, 2021, retrieved from Internet Archive Wayback Machine <http://web.archive.org/web/20211231094517/https://www.docker.com/get-started> on Jan. 20, 2022.

* cited by examiner

*Primary Examiner* — Joe Chacko
(74) *Attorney, Agent, or Firm* — Womble Bond Dickinson (US) LLP

(57) ABSTRACT

Methods and systems for managing distributed systems are disclosed. The distributed system may include any number of data processing systems that may contribute to the functionality of the distributed system. To contribute to the functionality of the distributed system, each of the data processing systems may need to be configured to facilitate cooperative operation. To manage configuration of data processing system, a control plane may be utilized. The control plane may utilize a consensus based process for managing leadership among members of the control plane.

20 Claims, 13 Drawing Sheets

US 11,818,021 B2

RESILIENT CONSENSUS-BASED CONTROL PLANE

FIELD OF THE DISCLOSED EMBODIMENTS

Embodiments disclosed herein relate generally to distributed management. More particularly, embodiments disclosed herein relate to systems and methods for managing control planes of distributed systems.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
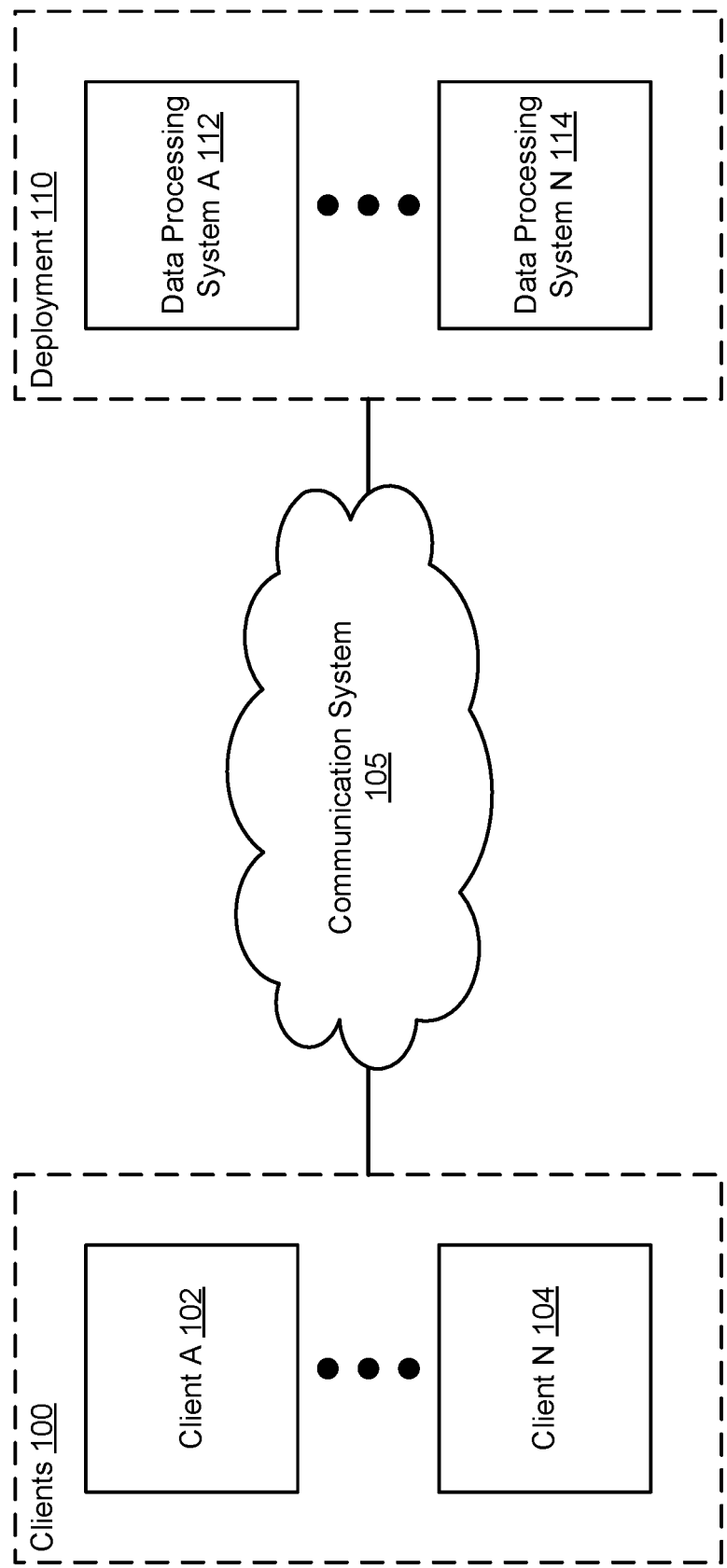
FIG. 1A shows a block diagram illustrating a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing distributed system. The distributed system may include any number of data processing systems (e.g., also referred to as resource data processing systems) that may contribute to the functionality of the distributed system. To contribute to the functionality of the distributed system, each of the data processing systems may need to be configured to facilitate cooperative operation.

To manage configuration of data processing system, a control plane may be utilized. The control plane may also include any number of data processing systems (e.g., also referred to as leading data processing systems). The data processing systems of the control plan may manage corresponding portions of the resource data processing systems by enforcing configurations on the resource data processing systems.

The configurations for the resource data processing systems may be selected by a leader. The leader may distribute the configurations to co-leader data processing systems of the deployment for enforcement on corresponding portions of the resource data processing systems.

To provide for resiliency in the face of unavailability of one or more of the data processing systems of the control plane, the control plane may implement a consensus based election scheme for leader selection. When a new leader is elected (e.g., in response to unavailability of a previous leader), the new leader may automatically obtain information regarding the configurations of the resource data processing systems from the co-leaders. The new leader may utilize the obtained information to select new configurations for the resource data processing systems.

By doing so, embodiments disclosed herein may improve the resiliency of distributed systems to unavailability of portions of the distributed system. By automatically selecting a new leader and recovering a system view of the distributed system (e.g., a deployment), the new leader may make informed decisions with respect to how to reconfigure the distributed system to continue the functionality of the distributed system even in the absence of unavailable leaders.

In an embodiment, a computer-implemented method for managing a deployment comprising data processing systems is provided. The method may include obtaining, by a first data processing system of the data processing systems, supplemental data from a second data processing system of the data processing systems in response to the first data processing system being elected as a leader of a control plane for the deployment, the second data processing system being a co-leader of the control plane, and the supplemental data indicates configurations of a first portion of resource data processing systems of the data processing systems; obtaining, by the first data processing system, a system view of the deployment using the supplemental data and local configurations maintained by the first data processing system, the local configurations being enforced by the first data processing system on a second portion of the resource data processing systems prior to the first data processing system being elected as the leader; obtaining, by the first data processing system, a new global configuration for the deployment based on the system view; enforcing, by the first data processing system, the new global configuration on the resource data processing systems using the second data processing system to obtain reconfigured resource data processing systems; and providing, by the first data processing system, computer implemented services to a client using the reconfigured resource data processing systems.

Enforcing the new global configuration may include distributing, by the first data processing system, second local configurations and second supplemental data to the second data processing system, wherein the second local configurations indicate configurations to be enforced, by the second data processing system, on one or more of the resource data processing systems, and the second supplemental data indicates configurations to be enforced, by a third data processing system, on one or more other resource data processing system.

The third data processing system may be a second co-leader of the control plane.

A cardinality of co-leaders of the control plane may be based on an estimated mean time between unavailability of data processing systems that are members of the control plane.

The control plane member data processing systems may each be tasked with managing configurations of respective portions of the resource data processing systems. The configurations of the respective portions of the resource data processing systems may be managed by enforcing configurations specified by the leader of the control plane.

The system view may indicate configurations enforced on all of the resource data processing systems by the control plane, the configurations enforced on all of the resource data processing systems being determined by an unavailable data processing system of the data processing systems that a previous leader of the control plane.

The new global configuration for the control plane may indicate portions of the resource data processing systems managed by respective co-leaders of the control plane; and updated configurations for each resource data processing system of the data processing systems.

The updated configurations may indicate operating configurations for hardware components of each respective resource data processing system of the data processing systems; and a software stack for each respective resource data processing system of the data processing systems.

The updated configurations, when implemented by the data processing systems, may cause the deployment to provide an integrated solution of computer implemented services.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may facilitate performance of workloads (e.g., computer-implemented workloads performed by executing computing instructions with at least one processor of one or more data processing systems). The system may include, but is not limited to, one or more clients 100, deployments 110, and a communication system 105 that facilitates operable connections between all, or a portion, of the components illustrated in FIG. 1A. Each of these components is discussed below.

All, or a portion, of clients 102-104 may provide services to users of clients 100 and/or to other devices operably connected to clients 100. To provide service (e.g., computer implemented services) to users or other devices, clients 100 may utilize services provided by deployment 110. Deployment 110 may provide any type and quantity of computer implemented services. The computer implemented services provided by deployment 110 may be specified by clients 100 and/or other entities.

Clients 100 and deployment 110 may provide any type and quantity of computer implemented services. The computer implemented services may include, for example, database services, instant messaging services, video conferencing services, data storage services, and/or other types of computer implemented services.

To provide the computer implemented services to client 100, deployment 110 may include any number of data processing systems 112-114. The data processing systems may each provide respective computer implemented services. The data processing systems may provide similar and/or different computer implemented services. All, or a portion, of the computer implemented services may be provided cooperatively by multiple computer implemented services while other computer implemented services may be provided independently by various data processing systems.

In aggregate, the computer implemented services provided by deployment 110 may provide one or more overall solutions (e.g., a solution architecture). An overall solution may be provided when deployment 110 provides one or more predetermined services.

For example, consider a scenario where deployment 110 provides tiered data storage services to clients 100. To provide the tiered data storage services, data processing systems 112-114N may need to (i) intake data, (ii) select a storage location for data, (iii) preprocess the data prior to storage (e.g., deduplication), (iv) store the data in the storage location, and (v) migrate the data between storage locations so as to properly tier the data as its relevance/importance changes over time. To provide functionalities (i)-(v), various data processing systems of deployment 110 may need to be appropriately configured (e.g., specific hardware settings, software settings, firmware, operating systems, service applications, etc.) with some data processing systems being configured differently. Further, configuration drift may need to be limited or prevent so that the data storage services may continue to be provided over time.

In general, embodiments disclosed herein relate to systems, methods, and devices for managing the configurations of data processing systems of a deployment. The configurations of the data processing systems may be managed to enable computer implemented services to be provided (e.g., the aggregate of all, or a portion, of which may give rise to a solution architecture).

To manage the configurations of data processing systems 112-114, a resilient control plane may be implemented. The control plane may manage the configurations of data processing system 112-114.

The resilient control plane may be tolerant to faults and automatically adapt to unavailability of devices that are members of the control plane. The members of the control plane may facilitate distributed storage of information usable to reconstruct global configurations for deployment 110 when a member (e.g., a leader) of the control plane that previously managed the global configurations for deployment 110 becomes unavailable.

When a leader of the control plane becomes unavailable (e.g., due to fault, communication failures, or other reasons), co-leaders of the control plane and/or managed data processing systems (e.g., also referred to as resource data processing systems) may perform a consensus election process to elect a new leader. Once the new leader is elected, the new leader may reconstruct a system view of deployment 110 and/or prepare a new set of global configurations. The new leader may broadcast (e.g., multi-cast) or otherwise distribute the global configurations to the co-leaders. The leader and co-leader may implement the global configurations by reconfiguring the resource data processing systems (e.g., corresponding portions) to match the global configures. Once complete, the reconfigured resource data processing systems may provide the computer implemented services.

When the global configurations are distributed by the leader, each of the co-leaders may store a first portion of the global configurations corresponding to the portion of the resource data processing systems that the respective co-leaders manage. The co-leaders may also store a second portion of the global configurations corresponding to other portions of the resource data processing systems. By doing so, redundant copies of the global configurations may be stored across the members of the control plane thereby allowing for data recovery in the event of unavailability of one or more of the members of the control plane.

Figure 1B:
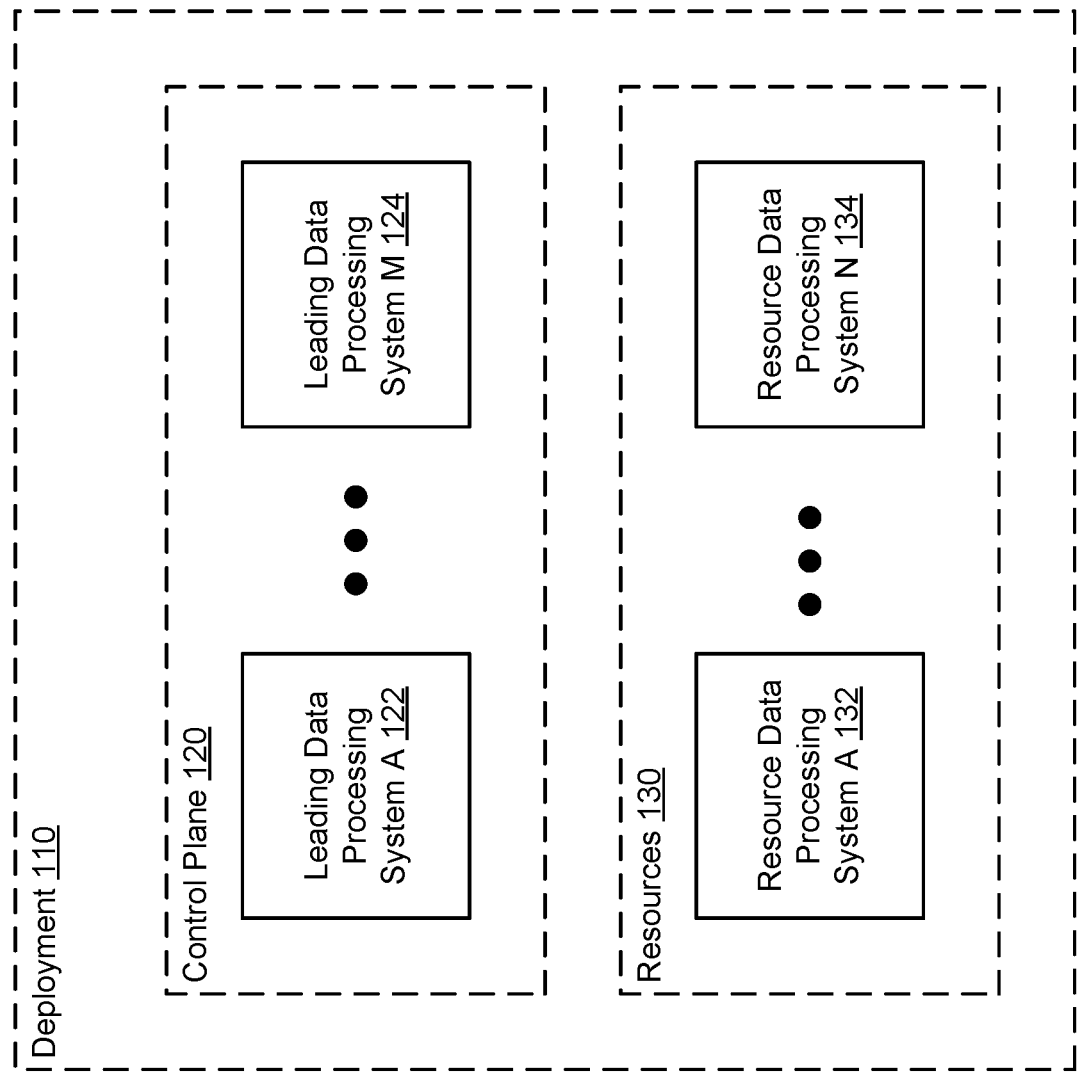
FIG. 1B shows a block diagram illustrating a deployment in accordance with an embodiment.

Refer to FIG. 1B for additional details regarding the control plane and resource data processing systems (e.g., the data processing systems 112-114 may be classified as either, depending on their configuration and operation).

By providing the above noted functionality, a system in accordance with embodiments disclosed herein may be more likely to provide desired computer implemented services over time even as various data processing systems of a deployment become unavailable. Consequently, the disclosed system may have improved resilience to challenging environments and use cases which may result in the unavailability of data processing systems.

For example, consider a scenario where a system includes data processing systems used as edge computing devices. By virtue of the nature of the environment in which edge computing devices operate, the uptime, connectivity, and/or other characteristics of the data processing systems may be comparatively low. Consequently, various data processing systems may become unavailable over time thereby depriving the edge computing devices from providing their desired functionalities. By dynamically and automatically responding to changes in availabilities of data processing systems, the continuity of the computer implemented services may be improved thereby providing a better user experience (e.g., which may, from the user's perspective, include fewer pauses, phantom slowdowns, and/or other undesirable characteristics of computer implemented services).

Any of clients 100 and deployment 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding computing devices, refer to FIG. 6. For additional details regarding data processing systems 112-114, refer to FIG. 2.

In an embodiment, communication system 105 includes one or more networks that facilitate communication between all, or a portion, of clients 100 and deployments 110. To provide its functionality, communication system 105 may be implemented with one or more wired and/or wireless networks. Any of these networks may be private, public, and/or may include the Internet. For example, clients 100 may be operably connected to one another via a local network which is operably connected to the Internet. Similarly, deployments 110 may be operably connected to one another via a second local network which is also operably connected to the Internet thereby allowing any of clients 100 and deployments 110 to communication with one another and/or other devices operably connected to the Internet. Clients 100, deployments 110, and/or communication system 105 may be adapted to perform one or more protocols for communicating via communication system 105.

While illustrated in FIG. 1A as including a limited number of specific components, a system in accordance with an embodiment may include fewer, additional, and/or different components than those illustrated therein.

As discussed above, deployment 110 may include a control plane that manages resource data processing systems. FIG. 1B shows a diagram of deployment 110 in accordance with an embodiment disclosed herein. As noted above, deployment 110 may include control plane 120 that manages resources 130.

Generally, control plane 120 and resources 130 may include various portions of data processing systems 112-114. Data processing systems 112-114 may be configured as either leading data processing systems (e.g., 122-124), resource data processing systems (e.g., 132-134), or other types not illustrated in FIG. 1B.

Leading data processing systems 122-124 may include any number of data processing systems that provide configuration management services for corresponding portions of resource data processing systems 132-134. One of leading data processing systems 122-124 may be a leader while the others may be co-leaders. The leader may select configurations to be enforced on resources 130 and distribute information regarding these configurations to the co-leaders. The co-leaders may use a portion of the distributed information to enforce configurations on the portion of resources 130 that each respective co-leader is tasked with managing. The co-leaders may also use another portion of the distributed information to provide for the distributed, redundant storage of configurations for all of resources 130. For example, the co-leaders may store portions of the distributed information corresponding to both the resource data processing systems that the respective co-leaders manage and also other resource data processing systems that are managed by other co-leaders.

If the leader becomes unavailable, one of the co-leaders may be elected to be the new leader. Once elected, the new leader may use the redundantly stored configurations for all of the resources 130 to obtain a global view of the system. Once obtained, the new leader may (or may not) obtain new configurations for any of resources 130, may modify which portions of resources 130 are managed by various co-leaders, and/or may perform other actions to reconfiguration the operation of deployment 110 in the absence of the unavailable leader such that deployment 110 is still available to provide the services that it is tasked with providing (e.g., to clients 100).

The number (e.g., a cardinality) of co-leaders and level of redundancy of the redundantly stored configurations may depend on expected and/or estimated rates of failures of data processing systems of control plane 120. For example, leading data processing systems 122-124 may be monitored for failure, and additional data processing systems may be added to or removed from control plane 120 to ensure that sufficient quantities of leading data processing systems are available even in the presence of changes unavailability rates.

Likewise, the quantity of redundantly stored configurations by leading data processing systems 122-124 may be modified based on the leading data processing device unavailability rate. For example, as the unavailability rate increases, each of the co-leaders may increase the quantity of redundantly stored configurations such that larger numbers of leading data processing systems may be concurrently unavailable without resulting in data loss, lack of management ability, and/or other undesired outcomes due to unavailability of devices (e.g., through errors in operation of the data processing systems, lack of operable connectivity, and/or other causes of unavailability).

While illustrated in FIG. 1B with a limited number of specific components, a deployment may include additional, fewer, and/or different components without departing from embodiments disclosed herein.

Figure 2:
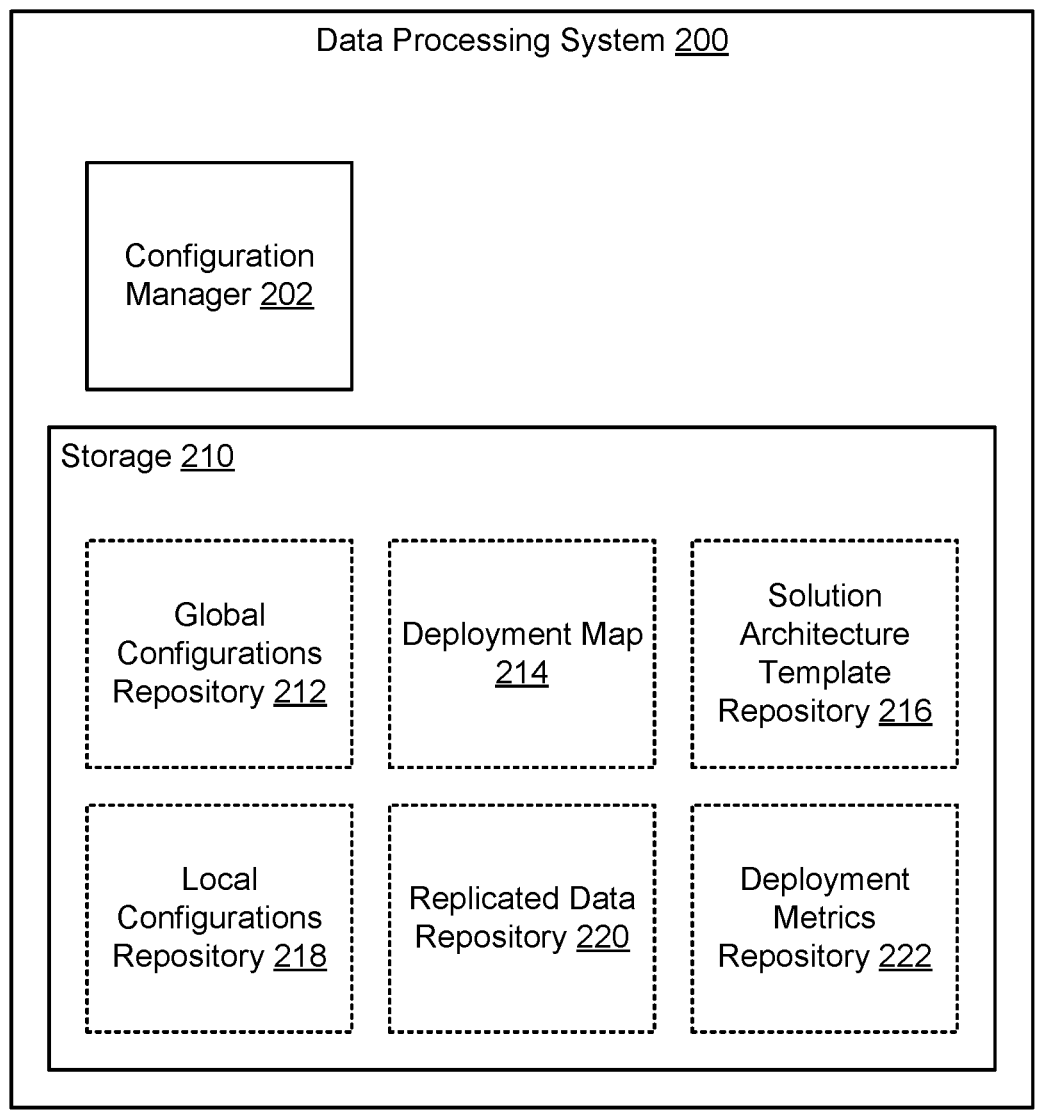
FIG. 2 shows a block diagram illustrating a data processing system in accordance with an embodiment.

Turning to FIG. 2, a diagram of an example data processing system 200 in accordance with an embodiment is shown. Data processing system 200 may be similar to any of data processing systems 112-114 shown in FIG. 1A. As discussed above, data processing system 200 may be used as a leading data processing system (e.g., as a leader or co-leader of a deployment) or as a resource data processing system. To provide the aforementioned functionality, data processing system 200 may include configuration manager 202 and storage 210. Each of these components is discussed below.

When operating as a resource data processing system, configuration manager 202 may facilitate configuration of data processing system 200. For example, data processing system 200 may include any number of hardware devices, host a software stack, and the hardware devices and/or software stack may be configurable. Configuring data processing system 200 may include modifying configurations for the hardware devices, deploying different software stacks, configuring the deployed software stacks, and/or performing other operations.

To facilitate configuration of data processing system 200, configuration manager 202 may obtain information regarding a desired configuration (e.g., from a leading data processing system tasked with managing the configuration of data processing system 200) and implement the desired configuration. By doing so, the operation of data processing system 200 may be modified to match that enforced by the control plane of a deployment to which data processing system 200 is a member.

When operating as a leading data processing system, configuration manager 202 may (i) participate in consensus election of a leader, (ii) while a co-leader, may (a) obtain configuration information from the leader, (b) enforce some of the configuration information on managed resource data processing systems, and (c) redundantly store copies of configuration associated with other resource data processing system that are not managed by data processing system 200 to facilitate reconstruction of global configurations/system view, (ii) while a leader, may (a) obtain redundantly stored configuration information from co-leaders, (b) reconstruct a system view/global configurations for the deployment using the configuration information, (c) obtain new configurations for resource data processing systems based on the system view/global configurations, (d) distribute the new configurations to the co-leaders for enforcement to obtain update resource data processing systems, and (e) provide desired computer implemented services (e.g., to clients or other entities) using the updated resource data processing systems.

By doing so, the configuration of a deployment may be maintained even as various data processing systems become unavailable. The redundantly and distributed storage of configuration information may facilitate continuity of operation of the deployment even when leader and/or co-leaders become unavailable.

Figure 3:
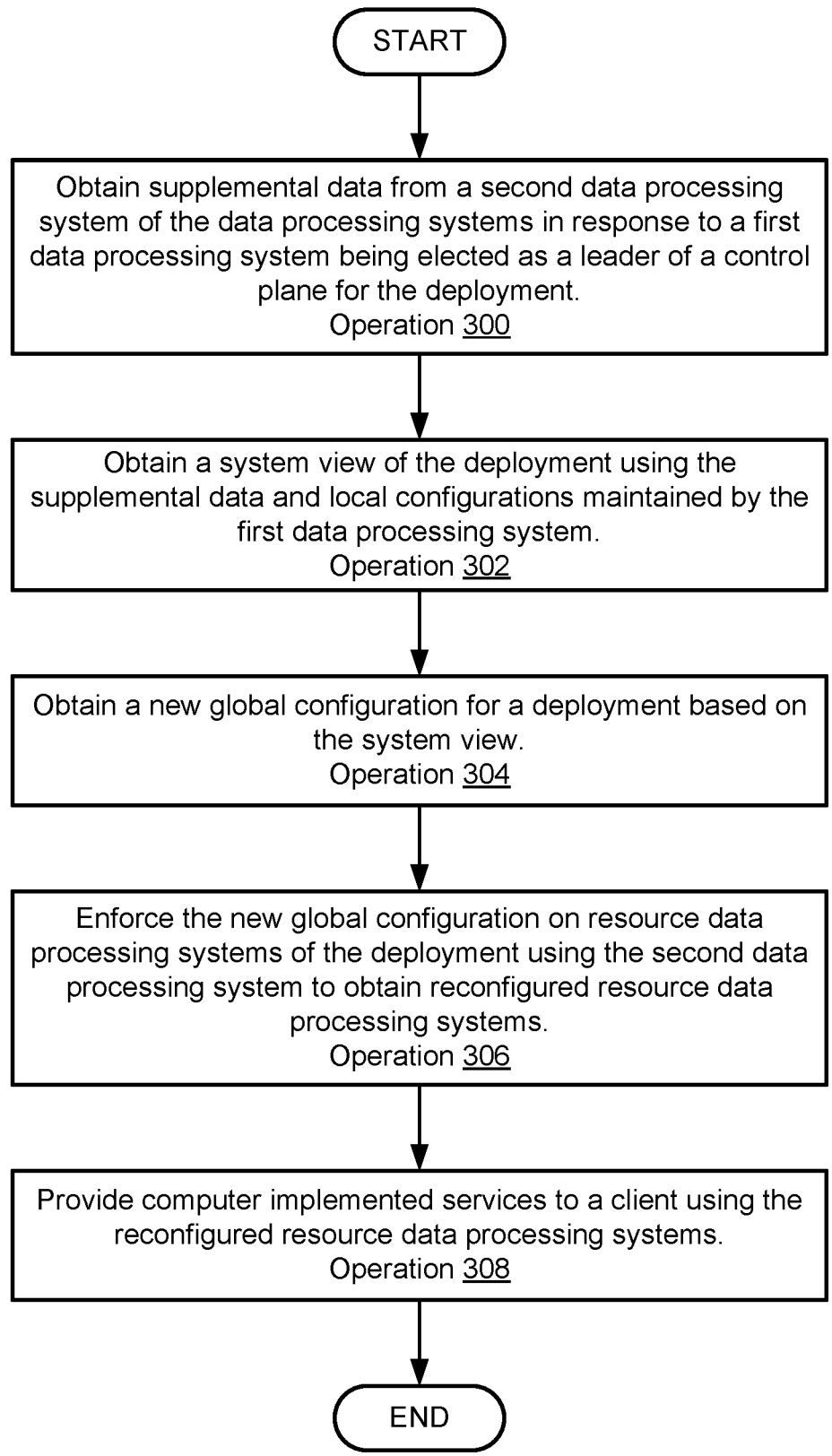
FIG. 3 shows a flow diagram illustrating a method of managing a control plane of a deployment in accordance with an embodiment.
Figure 4:
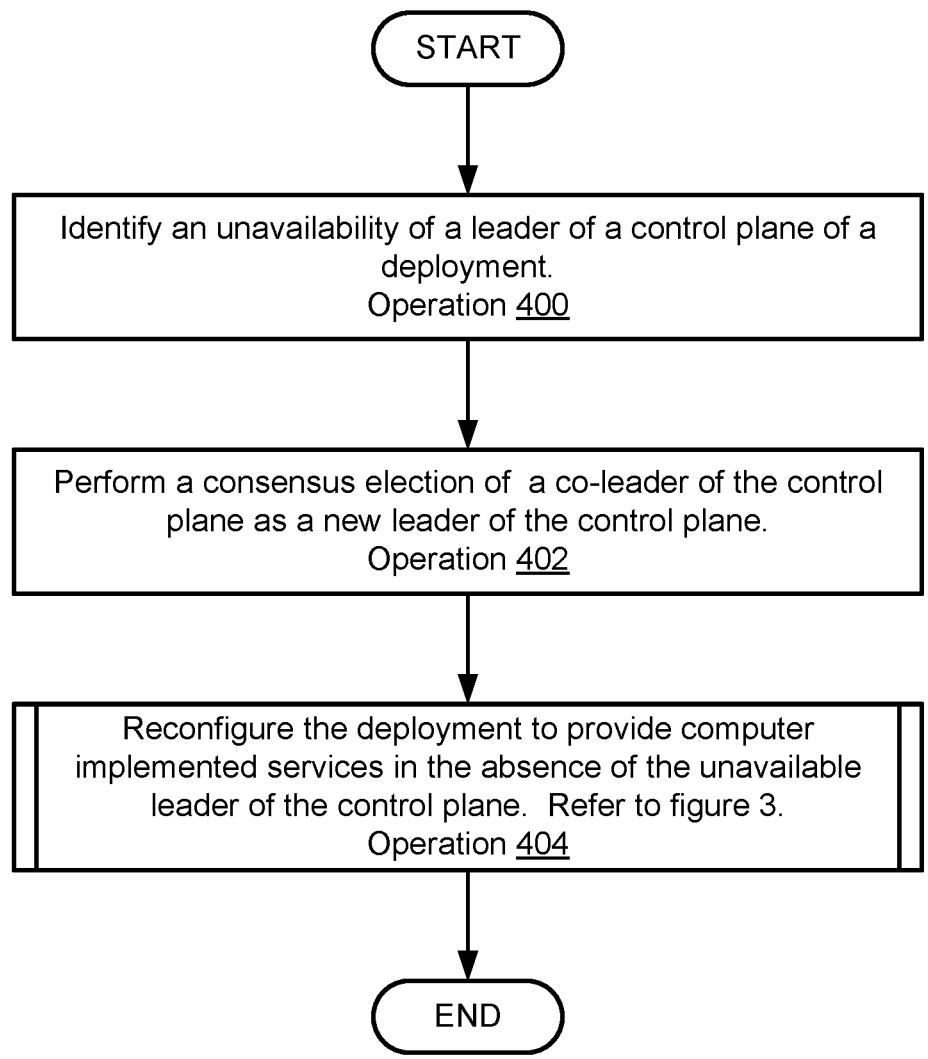
FIG. 4 is a flow diagram illustrating a method of managing unavailability of a leader of a control plane in accordance with an embodiment.

When providing its functionality, configuration manager 202 may perform all, or a portion, of the methods illustrated in FIGS. 3-4 and/or the operations and actions illustrated in FIGS. 5A-5G.

In an embodiment, configuration manager 202 is implemented using a hardware device including circuitry. The hardware device may be, for example, a digital signal processor, a field programmable gate array, or an application specific integrated circuit. The circuitry may be adapted to cause the hardware device to perform the functionality of configuration manager 202. Configuration manager 202 may be implemented using other types of hardware devices without departing from embodiments disclosed herein.

In an embodiment, configuration manager 202 is implemented using a processor adapted to execute computing code stored on a persistent storage that when executed by the processor performs the functionality of configuration manager 202 discussed throughout this application. The processor may be a hardware processor including circuitry such as, for example, a central processing unit or a microcontroller. The processor may be other types of hardware devices for processing digital information without departing from embodiments disclosed herein.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including global configurations repository 212, deployment map 214, solution architecture template repository 216, local configuration repository 218, replicated data repository 220, and/or deployment metrics repository 222. The data structures are drawn in FIG. 2A with a dashed outline to emphasize any of these data structure may not be present in storage 210 without departing from embodiments disclosed herein.

Global configurations repository 212 may include one or more data structures that include information regarding configurations for resource data processing systems. For example, global configurations repository 212 may specify, include, or otherwise indicate the configurations for each of the resource data processing systems of a deployment. The configurations may be based, for example, on a solution architecture template.

Deployment map 214 may include one or more data structures that include information regarding the components of a deployment. For example, deployment map 214 may include listings of available resource data processing devices, leading data processing devices, relationships between the devices (e.g., which leading data processing devices manager different resource data processing devices), and/or other types of information. The aforementioned information may be used to determine the configurations for the resource data processing systems, the management relationships, etc.

Solution architecture template repository 216 may include one or more data structures that include information regarding a solution architecture template. The solution architecture template may take, as input, the deployment map 214 and generate, as output, configurations for the resource data processing systems, management responsibility for the leading data processing systems, and/or other output usable to configuration data processing systems of a deployment so that computing implemented services corresponding to a solution associated with the solution architecture are provided by the deployment. Global configurations repository 212 may be populated based on the output of the solution architecture template.

Local configuration repository 218 may include one or more data structures that include information regarding configurations of resource data processing systems managed by data processing system 200. For example, local configuration repository 218 may include any number of configurations (e.g., specification regarding hardware device settings, software stacks, configurations for the software stack, etc.) for corresponding resource data processing systems managed by data processing system 200.

Replicated data repository 220 may include one or more data structures that include information regarding configurations of resource data processing systems managed by other data processing systems 200. For example, replicated data repository 220 may include any number of configurations (e.g., specification regarding hardware device settings, software stacks, configurations for the software stack, etc.) for corresponding resource data processing systems managed by different data processing systems such that the replicated data repositories of co-leader data processing systems (e.g., in combination with location configurations repositories) may be able to reconstruct global configuration repository 212 as a global system view of the deployment. In other words, replicated data repository 220 may include a portion of global configuration repository 212 corresponding to other data processing systems (e.g., other leaders and/or other co-leaders). The quantity of replicated configurations stored in replicated data repository 220 may depend, for example, on the likelihood of members of the control plane of a deployment becoming unavailable. The quantity of replicated configurations may be determined using deployment metrics repository 222.

Deployment metrics repository 222 may include one or more data structures that include information regarding data replication requirements for a control plane of a deployment. For example, deployment metrics repository 222 may specify the quantity or level of data replication to be implemented with replicated data repository 220 as a function of the likelihood of members of the control plane becoming unavailable. Generally, as the likelihood of unavailability increases, the quantity of configurations required to be stored in replicated data repository 220 may increase (e.g., thereby making the control plane less likely to total fail when members become unavailable).

While various data structures have been illustrated and described in FIG. 2 with specific structures, any of the data structures may be implemented with various types of structures (e.g., lists, tables, linked lists, databases, etc.), stored in different locations, may include different/less/more information than described above, and/or spanned across any number of devices without departing from embodiments disclosed herein.

While illustrated in FIG. 2 with a limited number of specific components, a client may include additional, fewer, and/or different components without departing from embodiments disclosed herein.

As discussed above, the components of FIG. 1A may perform various methods to manage a deployment. FIGS. 3-4 illustrates examples of methods that may be performed by the components of FIG. 1A. In the diagrams discussed below and shown in FIGS. 3-4, any of the operations may be repeated, performed in different orders, and/or performed in parallel with or a partially overlapping in time manner with other operations.

Turning to FIG. 3, a flow diagram illustrating a method of establishing a leader for a control plane in accordance with an embodiment is shown. The method may be performed by a data processing system (e.g., a leading data processing system) or another entity.

Prior to operation 300, a first data process system of data processing systems of a control plane may be elected as a leader in response to unavailability of the previous leader.

At operation 300, supplemental data from a second data processing system of the data processing systems is obtained in response to the first data processing system being elected as the leader of the control plane for the deployment. The supplemental data may be obtained by requesting it from the second data processing system. The second data processing system may be a co-leader of the control plane. The supplemental data may be transmitted to the first data processing system via one or more messages or via another transfer method.

The supplemental data may indicate configurations of a first portion of resource data processing systems of the data processing systems. The first portion of resource data processing system may be managed by the second data processing system. The configurations for the first portion may have been established by the previous leader. The first data processing system may not have had access to the configurations for the first portion prior to obtaining them (e.g., to limit storage resource of the first data processing system used for storing redundant copies of configurations).

At operation 302, a system view of the deployment is obtained using the supplemental data and local configurations maintained by the first data processing system. The system view may be obtained by combining the configurations of the supplemental data and configurations of the local configurations (and/or other configurations from other data processing systems of the control plane). The aggregated configurations may present a view of the configuration of the deployment as it currently exists, which may be different from that expected or otherwise to be implemented (e.g., due to the unavailability of the previous leader or other changes).

The local configurations being enforced by the first data processing system on a second portion of the resource data processing systems prior to the first data processing system being elected as the leader. For example, the first data processing system, prior to being elected leader, may have been a co-leader tasked with managing the configurations of the second portion of the resource data processing systems.

At operation 304, a new global configuration for the deployment based on the system view may be obtained. The new global configuration may be obtained using a solution architecture template with the system view being used as input and configurations for the resource data processing systems being output as the new global configuration. The new global configuration may be obtained via other methods without departing from embodiments disclosed herein.

At operation 306, the new global configuration is enforced on the resource data processing systems using the second data processing system to obtain reconfigured resource data processing systems. The new global configuration may be enforced by distributing copies of it to the co-leaders of the control plane. The co-leaders may extract relevant configurations for the resource data processing system that they respectively manage, as well as some redundant configurations. The co-leaders may then modify the configurations of the corresponding resource data processing systems based on the obtained configurations.

For example, the resource data processing systems may be modified by performing one or more of: (i) modifying a hardware setting to match a configuration, (ii) adding, removing, and/or modifying software to match the configuration, (iii) adding, removing, and/or modifying firmware to match the configuration, and/or (iv) modifying settings for the software/firmware to match the configuration.

The resource data processing systems may be modified via any method to match the respective configurations. For example, the corresponding co-leaders may send instructions, publish instructions, invoke functionality of out of band management entities of the resource data processing systems, etc. The corresponding resource data processing systems may cooperate as part of the configuration process (e.g., by deploying software, modifying settings, etc.).

At operation 308, computer implemented services are provided to a client using the reconfigured resource data processing systems. By reconfiguring the resource data processing systems, as discussed above, the resource data processing systems may automatically provide the computer implemented services.

The method may end following operation 308.

Turning to FIG. 4, a flow diagram illustrating a method of responding to unavailability of a leader in accordance with an embodiment is shown. The method may be performed by a data processing system or another entity.

At operation 400, unavailability of a leader of a control plane is identified. The unavailability may be due, for example, to inoperability of the leader, a lack of operable connection to the leader, and/or other factors.

The unavailability may be identified via any method. For example, the leader may provide a heartbeat signal to co-leaders. The lack of the heart beat signal may indicate the unavailability of the leader.

At operation 402, a consensus election of a co-leader of the control plane as a new leader of the control plane is performed. The election may be performed via any method. For example, the co-leaders may vote for the leader, the co-leaders may have been previously ranked prior to the unavailability of the leader and the leader may be determined based on the ranking, the co-leader that minimizes computing resources use or other computing resource use for managing the deployment may be selected as the leader with the co-leaders voting for the most fit co-leader, etc.

At operation 404, the deployment is reconfigured to provide computer implemented services in the absence of the unavailable leader of the control plane. The deployment may be reconfigured as illustrated in and described with respect to FIG. 3. For example, the newly elected leader of the control plane may perform all, or a portion, of the method shown in FIG. 3.

The method may end following operation 404.

Using the methods illustrated in FIGS. 3-4, embodiments disclosed herein may facilitate operation of a deployment in dynamic environment in which data processing systems of the deployment may become unavailable (e.g., unexpectedly). Thus, a distributed system in accordance with embodiments disclosed herein may have improved uptime thereby improving the quality of computer implemented services provided by the distributed system (e.g., a deployment).

To further clarify embodiments disclosed herein, FIGS. 5A-5G show diagrams in accordance with an embodiment disclosed herein illustrating example operation of a system similar to that shown in FIG. 1A over time. In these figures, actions performed by various components are highlighted with numbered circular element and interactions between components (e.g., communications, data transport, etc.) are highlighted using arrows with dashed tails.

Figure 5A:
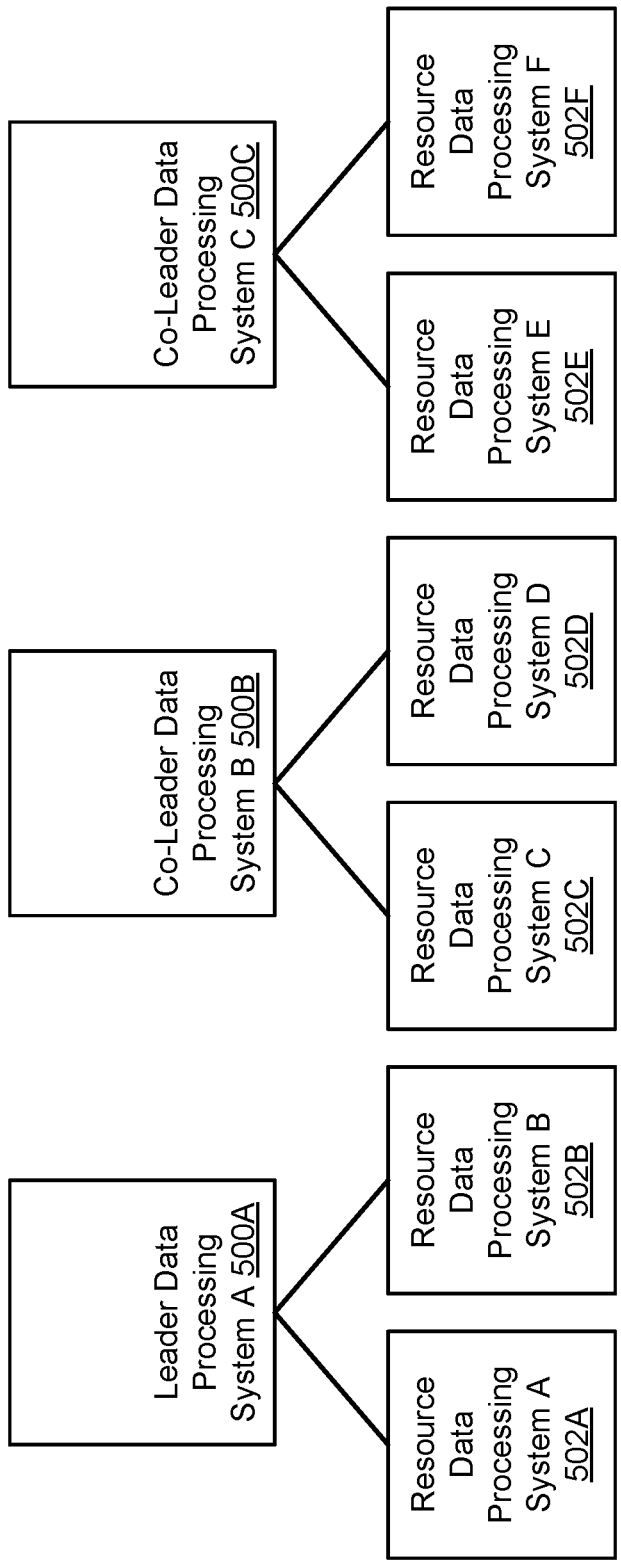
FIGS. 5A-5G show diagrams illustrating example operations performed by an example system over time in accordance with an embodiment.

Turning to FIG. 5A, consider an example scenario where a deployment includes three data processing systems 500A-500C that operate as a control plane for six data processing systems 502A-502F. In FIG. 5A, the lines connecting the leader/co-leader data processing systems to resource data processing systems indicate that the leader/co-leader data processing systems manage the configurations of the resource data processing systems connected by the lines.

Figure 5B:
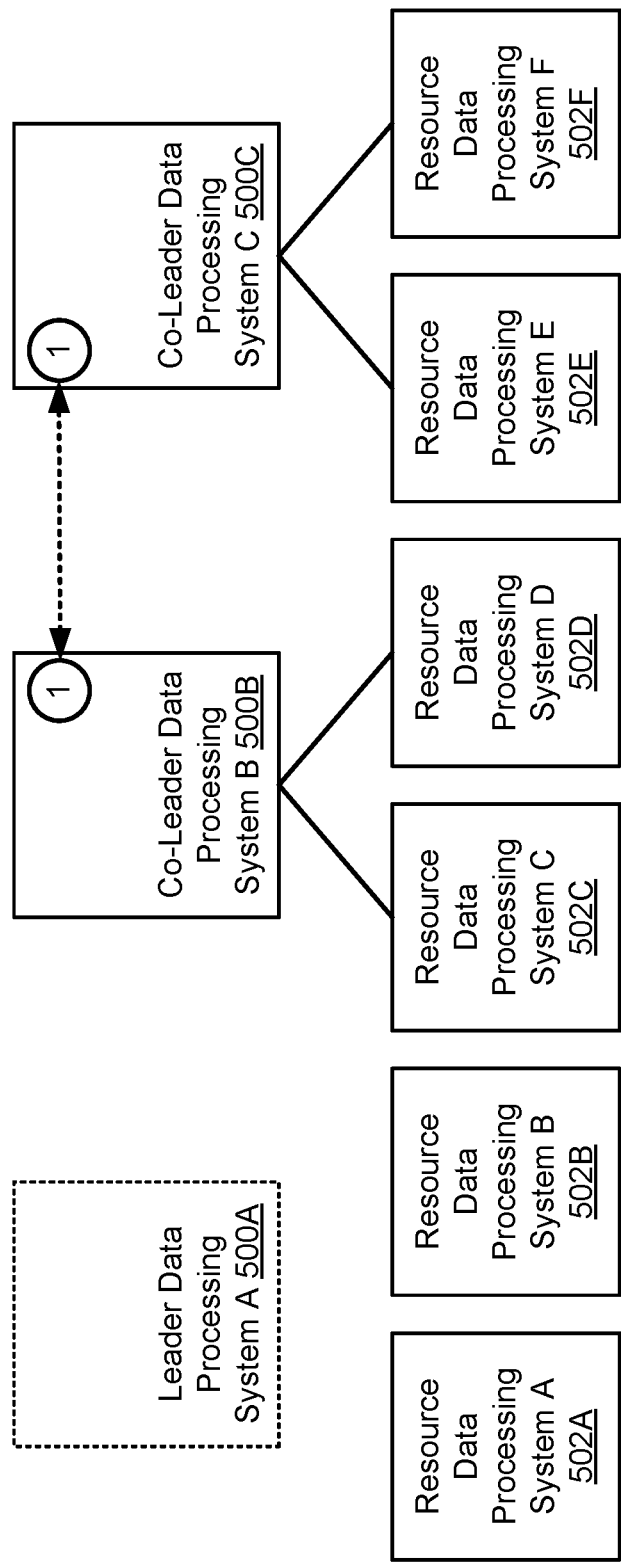

At a first point in time, as shown in FIG. 5B, the processor of leader data processing system A 500A resulting in unavailability (e.g., shown in FIG. 5B with the dashed outline of leader data processing system A 500A).

In response to the unavailability, at block 1, coleader data processing systems B and C 500B, 500C perform a consensus based election of a new leader. Co-leader data processing system B 500B wins the election.

Figure 5C:
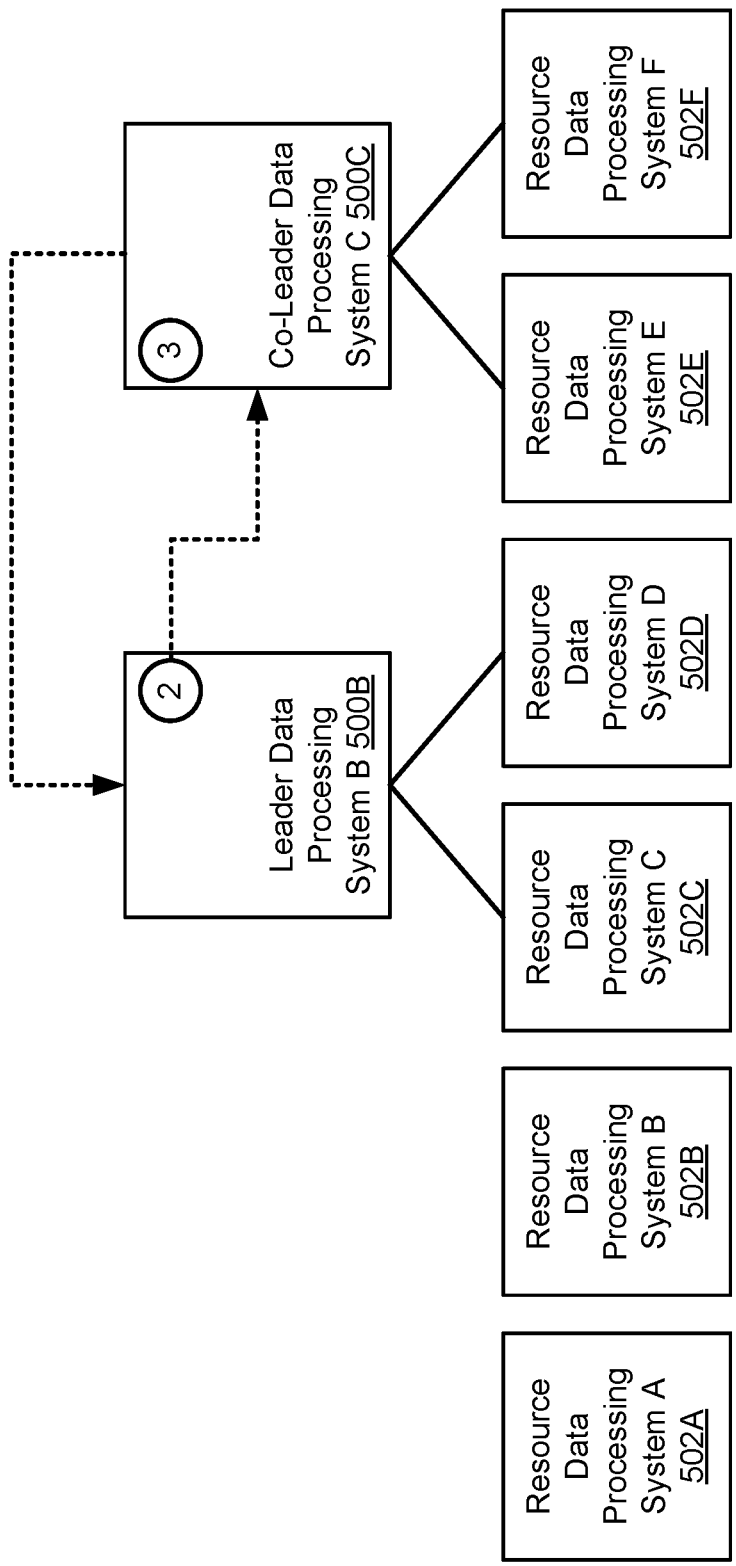

Turning to FIG. 5C, at block 2, leader data processing system B 500B sends a request for supplementary data from co-leader data processing system C 500C so that it may generate a system view. In response, at block 3, co-leader data processing system C 500C reads the supplementary data from its replicated data repository (e.g., 220, FIG. 2) and provides a copy of it to leader data processing system B 500B.

Figure 5D:
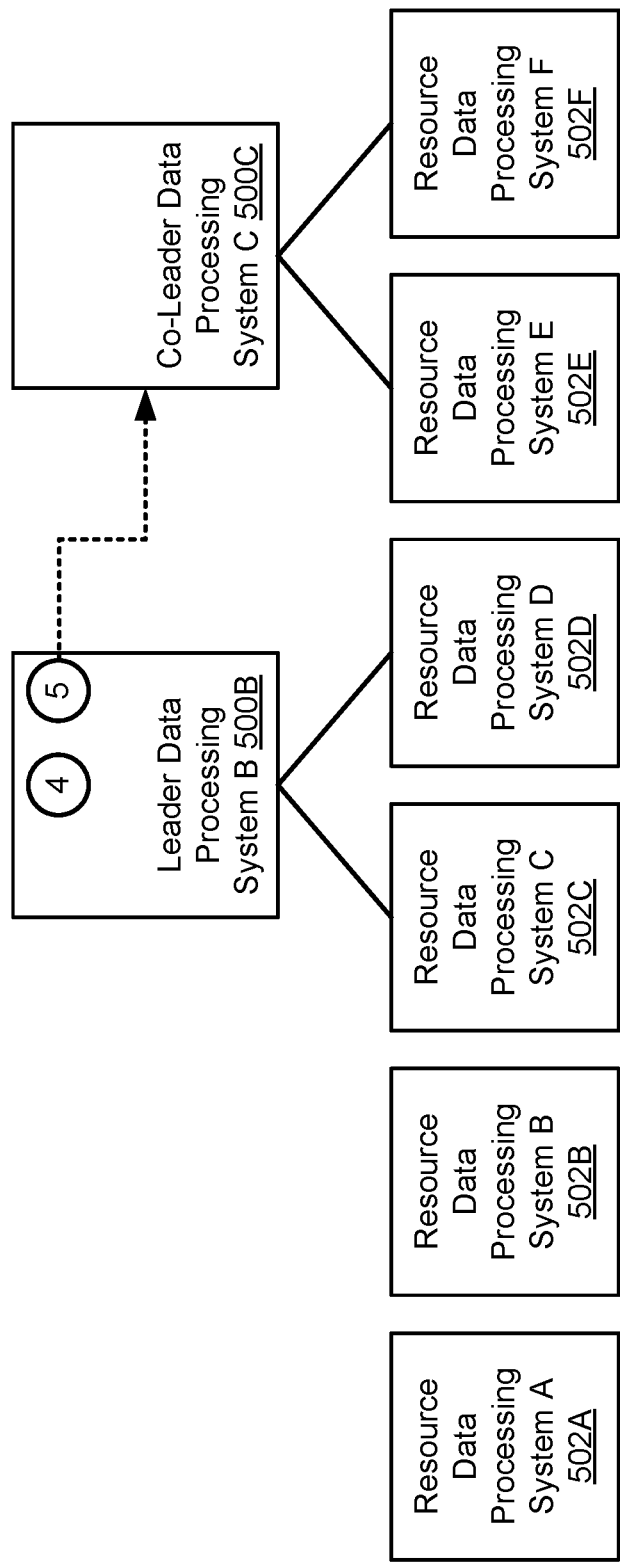

Turning to FIG. 5D, at block 4, leader data processing system B 500B uses the supplementary data (e.g., in combination with its own local configuration that it enforced as a co-leader) to generate the system view. Using the system view, leader data processing system B 500B obtains new configurations for each of the remaining data processing systems and determines a new management configuration where each of the remaining control plane data processing systems manage three resource data processing systems, respectively.

At block 5, leader data processing system B 500B distributes the new configurations to co-leader data processing system C 500C as well as the new resource data processing system management plan.

Figure 5E:
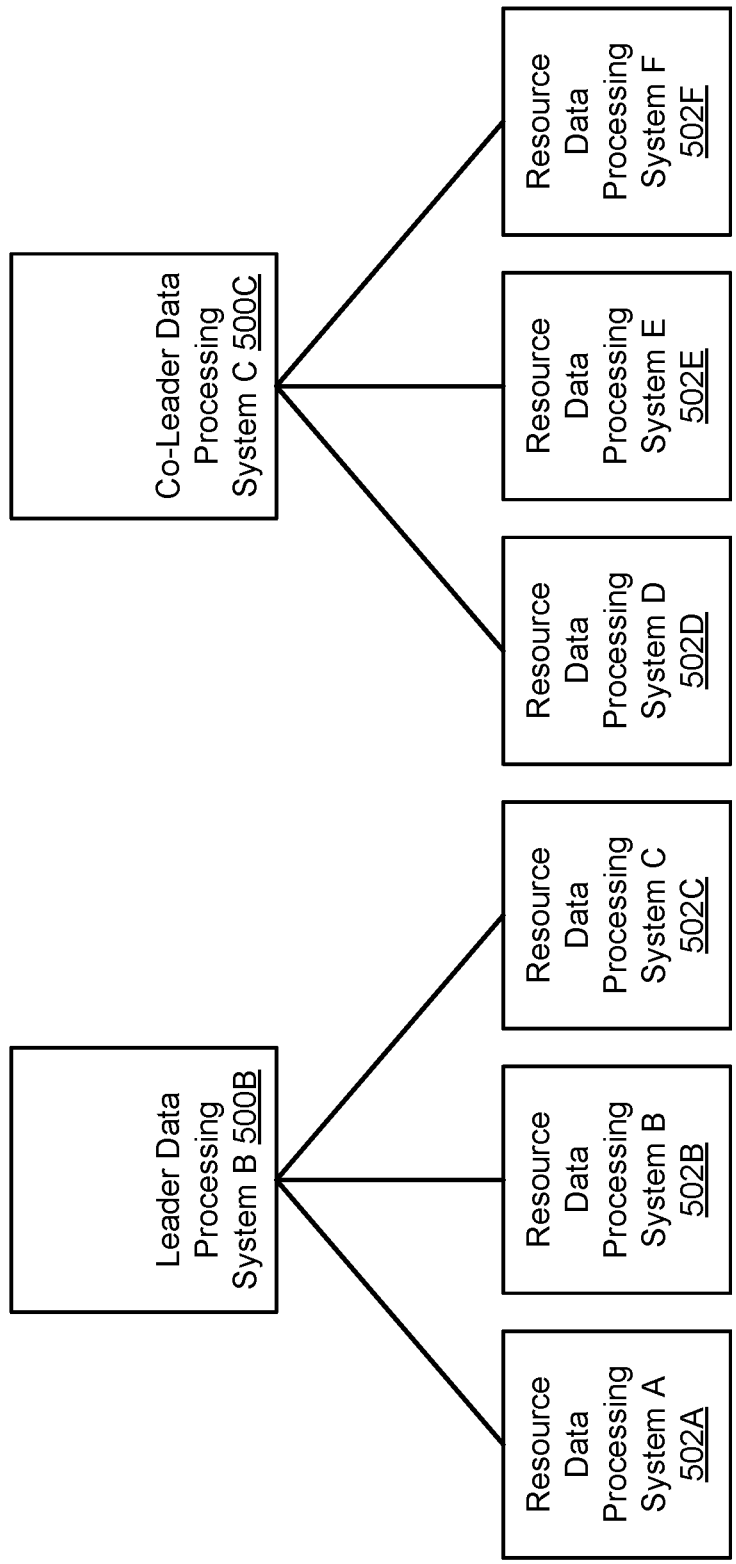

Turning to FIG. 5E, leader data processing system B 500B and co-leader data processing system C 500C implement the new management plan by initiating management of resource data processing systems 502A-502C and 502D-502F, respectively.

Figure 5F:
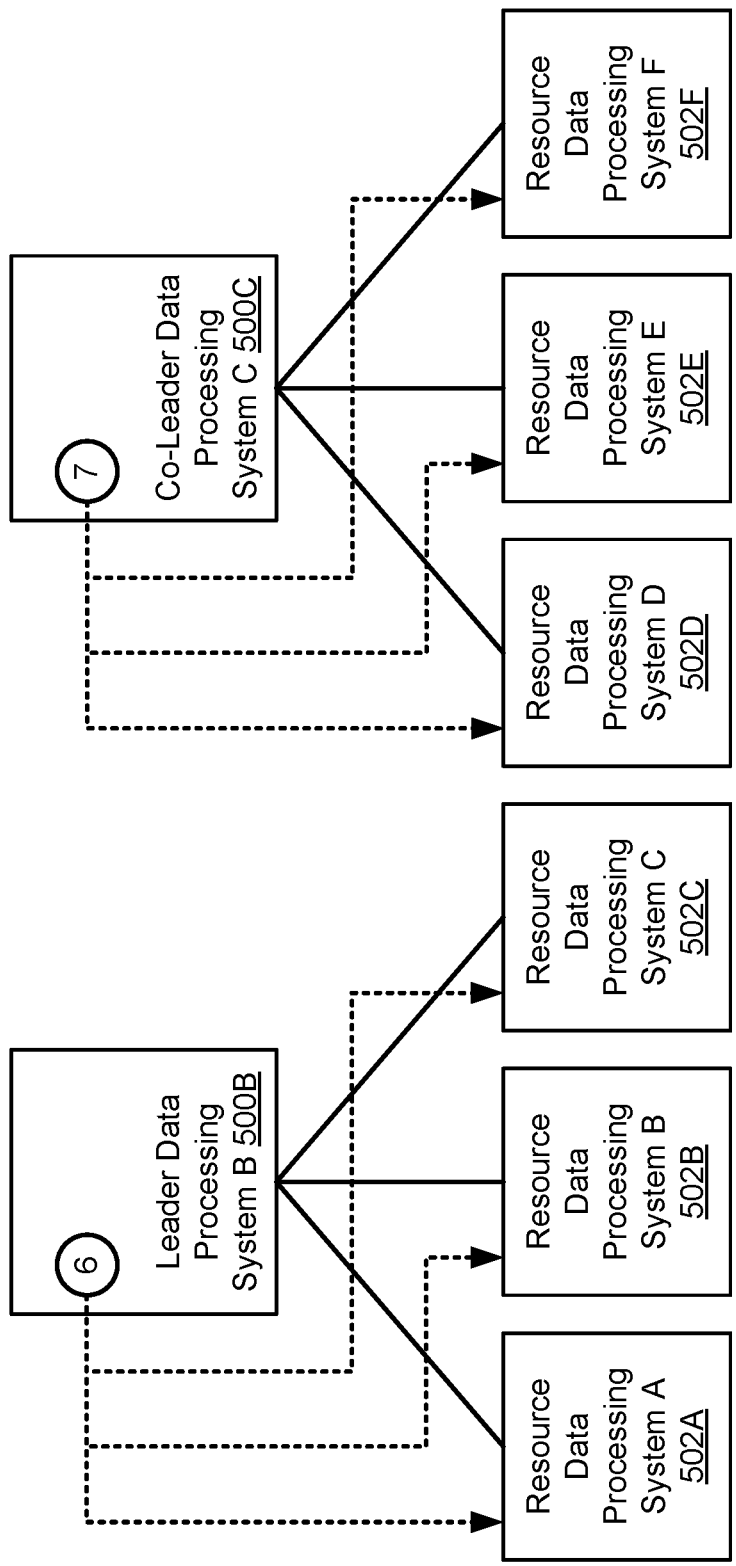

Turning to FIG. 5F, after initiating management, at blocks 6 and 7, the data processing systems of the control plane begin to enforce configurations on the respectively managed resource data processing systems 502A-502C and 502D-502F, respectively. For example, the data processing systems of the control plane may instruct the managed resource data processing systems accordingly.

Figure 5G:
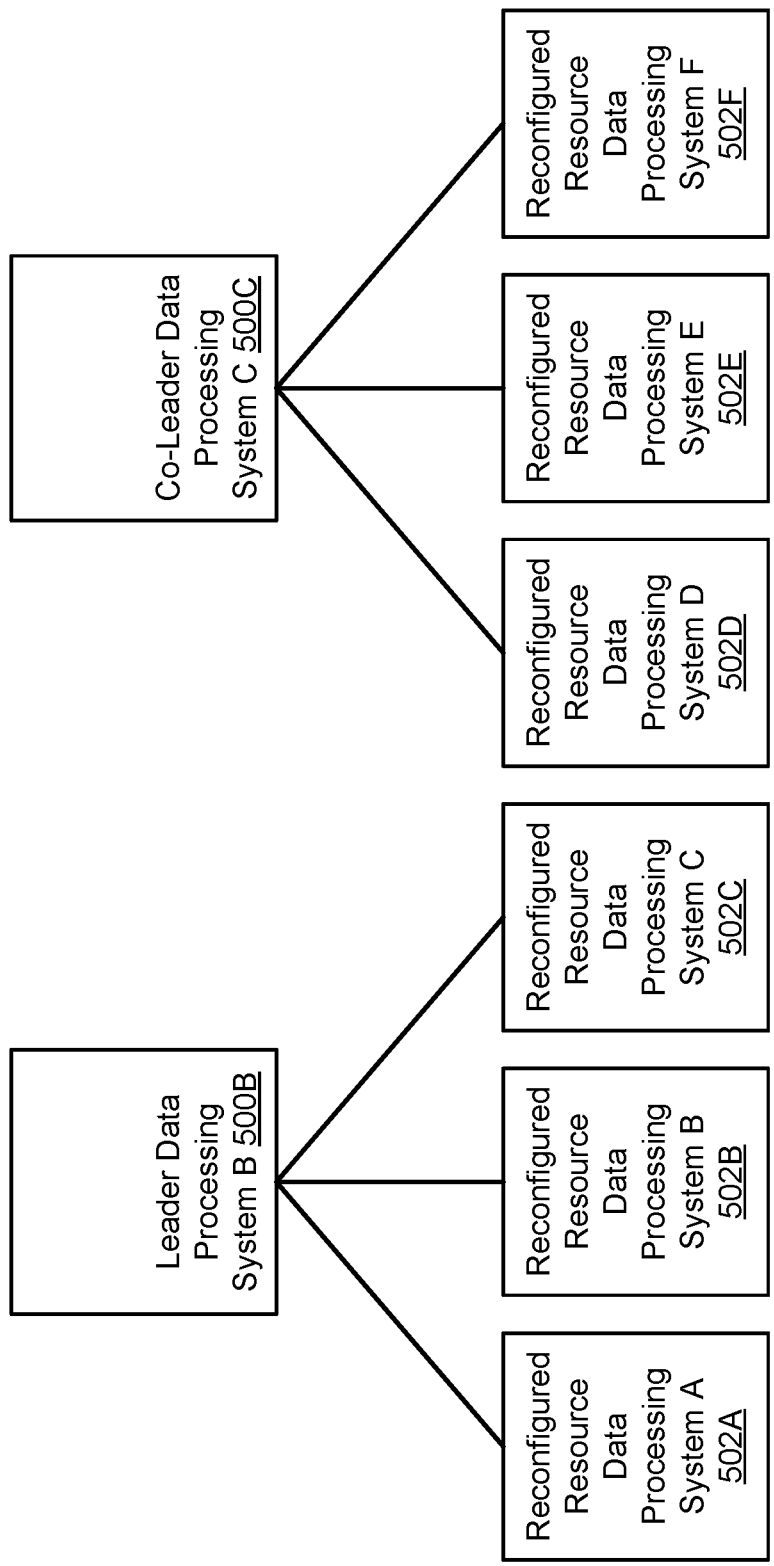

Turning to FIG. 5G, once the configurations are enforced, the resource data processing systems 502A-502F may be reconfigured in accordance with the configurations obtained by leader data processing system B 500B.

Consequently, reconfigured resource data processing systems 502A-502F may begin to provide desired computer implemented services.

Figure 6:
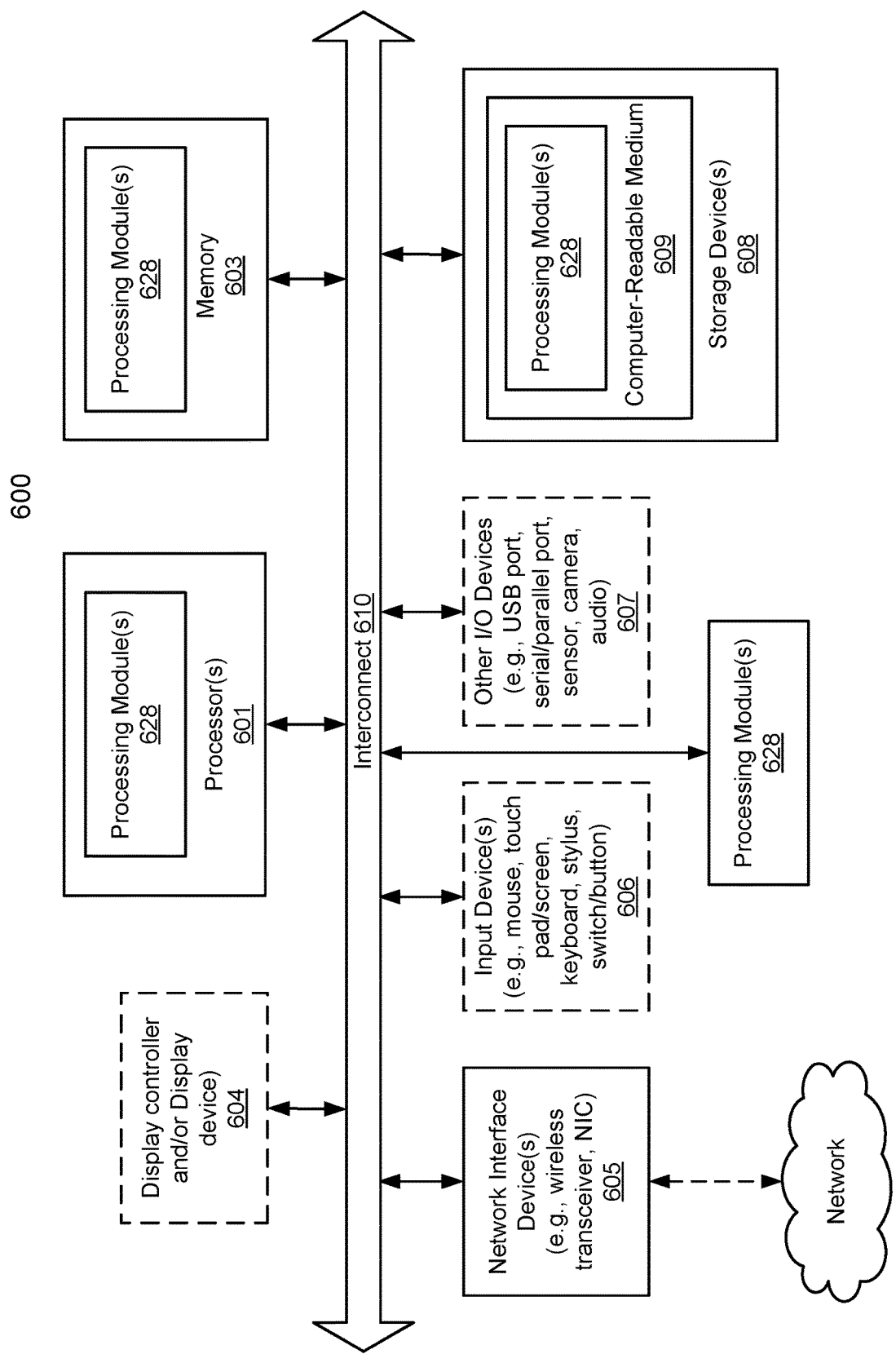
FIG. 6 shows a block diagram illustrating a data processing system in accordance with an embodiment.

Any of the components illustrated in FIGS. 1-5G may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing a deployment comprising data processing systems, the method comprising:

obtaining, by a first data processing system of the data processing systems, supplemental data from a second data processing system of the data processing systems in response to the first data processing system being elected as a leader of a control plane for the deployment, the second data processing system being a co-leader of the control plane, and the supplemental data indicates configurations of a first portion of resource data processing systems of the data processing systems;

obtaining, by the first data processing system, a system view of the deployment using the supplemental data and local configurations maintained by the first data processing system, the local configurations being enforced by the first data processing system on a second portion of the resource data processing systems prior to the first data processing system being elected as the leader;

obtaining, by the first data processing system, a new global configuration for the deployment based on the system view;

enforcing, by the first data processing system, the new global configuration on the resource data processing systems using the second data processing system to obtain reconfigured resource data processing systems; and providing, by the first data processing system, computer implemented services to a client using the reconfigured resource data processing systems, wherein a cardinality of co-leaders of the control plane is based on an estimated mean time between unavailability of data processing systems that are members of the control plane.

2. The computer-implemented method of claim 1, wherein enforcing the new global configuration comprises:

distributing, by the first data processing system, second local configurations and second supplemental data to the second data processing system, wherein the second local configurations indicate configurations to be enforced, by the second data processing system, on one or more of the resource data processing systems, and the second supplemental data indicates configurations to be enforced, by a third data processing system, on one or more other resource data processing system.

3. The computer-implemented method of claim 2, wherein the third data processing system is a second co-leader of the control plane.

4. The computer-implemented method of claim 1, wherein the control plane member data processing systems are each tasked with managing configurations of respective portions of the resource data processing systems.

5. The computer-implemented method of claim 4, wherein the configurations of the respective portions of the resource data processing systems are managed by enforcing configurations specified by the leader of the control plane.

6. The computer-implemented method of claim 1, wherein:

the system view indicates configurations enforced on all of the resource data processing systems by the control plane, the configurations enforced on all of the resource data processing systems being determined by an unavailable data processing system of the data processing systems that is a previous leader of the control plane, and the first data processing system is elected as the leader of the control plane for the deployment by the co-leader of the control plane.

7. The computer-implemented method of claim 6, wherein the new global configuration for the control plane indicates:

portions of the resource data processing systems managed by respective co-leaders of the control plane; and updated configurations for each resource data processing system of the data processing systems.

8. The computer-implemented method of claim 7, wherein the updated configurations indicate:

operating configurations for hardware components of each respective resource data processing system of the data processing systems; and a software stack for each respective resource data processing system of the data processing systems.

9. The computer-implemented method of claim 8, wherein the updated configurations, when implemented by the data processing systems, cause the deployment to provide an integrated solution of computer implemented services.

10. A non-transitory machine-readable medium having instructions stored therein, which when executed by a processor, cause the processor to perform operations for managing a deployment comprising data processing systems, the operations comprising:

obtaining, by a first data processing system of the data processing systems, supplemental data from a second data processing system of the data processing systems in response to the first data processing system being elected as a leader of a control plane for the deployment, the second data processing system being a co-leader of the control plane, and the supplemental data indicates configurations of a first portion of resource data processing systems of the data processing systems;

obtaining, by the first data processing system, a system view of the deployment using the supplemental data and local configurations maintained by the first data processing system, the local configurations being enforced by the first data processing system on a second portion of the resource data processing systems prior to the first data processing system being elected as the leader;

obtaining, by the first data processing system, a new global configuration for the deployment based on the system view;

enforcing, by the first data processing system, the new global configuration on the resource data processing systems using the second data processing system to obtain reconfigured resource data processing systems; and providing, by the first data processing system, computer implemented services to a client using the reconfigured resource data processing systems, wherein a cardinality of co-leaders of the control plane is based on an estimated mean time between unavailability of data processing systems that are members of the control plane.

11. The non-transitory machine-readable medium of claim 10, wherein enforcing the new global configuration comprises:

distributing, by the first data processing system, second local configurations and second supplemental data to the second data processing system, wherein the second local configurations indicate configurations to be enforced, by the second data processing system, on one or more of the resource data processing systems, and the second supplemental data indicates configurations to be enforced, by a third data processing system, on one or more other resource data processing system.

12. The non-transitory machine-readable medium of claim 11, wherein the third data processing system is a second co-leader of the control plane.

13. The non-transitory machine-readable medium of claim 10, wherein the control plane member data processing systems are each tasked with managing configurations of respective portions of the resource data processing systems.

14. A data processing system, comprising:
a processor; and
a memory coupled to the processor to store instructions, which when executed by the processor, cause the processor to perform operations for managing a deployment comprising data processing systems comprising the data processing system, the operations comprising:
obtaining supplemental data from a second data processing system of the data processing systems in response to the data processing system being elected as a leader of a control plane for the deployment, the second data processing system being a co-leader of the control plane, and the supplemental data indicates configurations of a first portion of resource data processing systems of the data processing systems;
obtaining a system view of the deployment using the supplemental data and local configurations maintained by the data processing system, the local configurations being enforced by the data processing system on a second portion of the resource data processing systems prior to the data processing system being elected as the leader;
obtaining a new global configuration for the deployment based on the system view;
enforcing the new global configuration on the resource data processing systems using the second data processing system to obtain reconfigured resource data processing systems; and providing computer implemented services to a client using the reconfigured resource data processing systems, wherein a cardinality of co-leaders of the control plane is based on an estimated mean time between unavailability of data processing systems that are members of the control plane.

15. The data processing system of claim 14, wherein enforcing the new global configuration comprises:
distributing second local configurations and second supplemental data to the second data processing system, wherein the second local configurations indicate configurations to be enforced, by the second data processing system, on one or more of the resource data processing systems, and the second supplemental data indicates configurations to be enforced, by a third data processing system, on one or more other resource data processing system.

16. The data processing system of claim 15, wherein the third data processing system is a second co-leader of the control plane.

17. The data processing system of claim 14, wherein the control plane member data processing systems are each tasked with managing configurations of respective portions of the resource data processing systems.

18. The non-transitory machine-readable medium of claim 13, wherein the configurations of the respective portions of the resource data processing systems are managed by enforcing configurations specified by the leader of the control plane.

19. The data processing system of claim 17, wherein the configurations of the respective portions of the resource data processing systems are managed by enforcing configurations specified by the leader of the control plane.

20. The data processing system of claim 14, wherein:
the system view indicates configurations enforced on all of the resource data processing systems by the control plane, the configurations enforced on all of the resource data processing systems being determined by an unavailable data processing system of the data processing systems that is a previous leader of the control plane, and the first data processing system is elected as the leader of the control plane for the deployment by the co-leader of the control plane.

* * * * *